Sept. 14, 1965  E. J. SCHAEFER  3,206,261
GREASE FEED DEVICE
Filed April 4, 1962
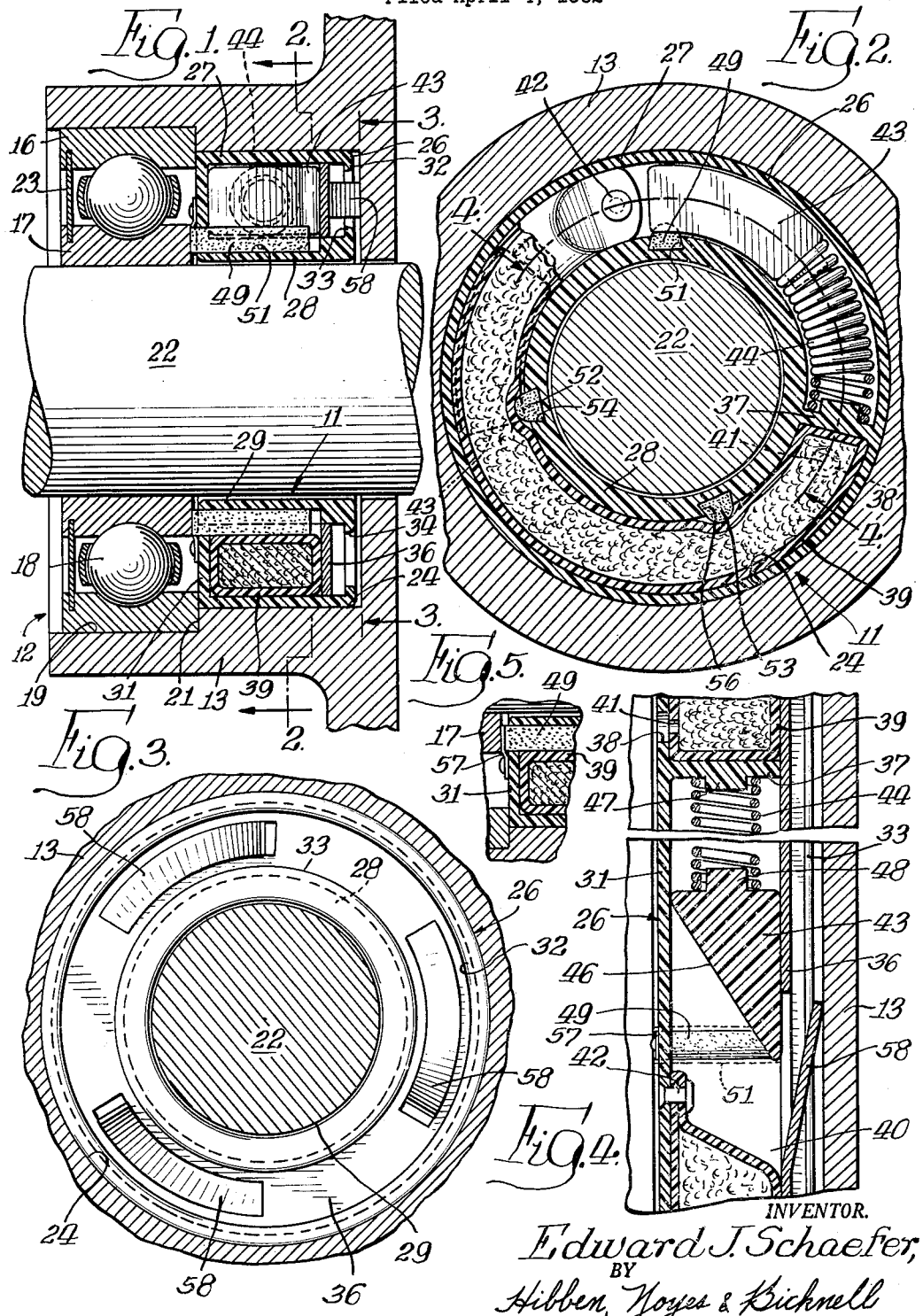
INVENTOR.
Edward J. Schaefer,
BY
Hibben, Noyes & Bicknell
Atty's.

United States Patent Office 3,206,261
Patented Sept. 14, 1965

3,206,261
GREASE FEED DEVICE
Edward J. Schaefer, Bluffton, Ind., assignor to Franklin Electric Co., Inc., Bluffton, Ind., a corporation of Indiana
Filed Apr. 4, 1962, Ser. No. 185,080
20 Claims. (Cl. 308—187)

This invention relates to bearing lubricators and, more particularly, to a device for automatically feeding grease to bearings.

It is a primary object of the present invention to provide a novel grease feed device for an anti-friction bearing such as a ball bearing adapted to automatically feed a supply of grease to such bearing at intervals over a long period of time, thereby increasing the bearing life.

Another object is to provide a novel grease feed device that injects grease into a bearing after the bearing has been operated a certain amount.

A further object is to provide a novel grease feed device adapted to keep a supply of grease adjacent a bearing and in clean unoxidized condition for a long period of time and thereafter to automatically inject such clean grease into the bearing.

Yet another object is to provide a novel grease feed device that is small in size and inexpensive to manufacture, and provides bearing lubrication over a long period of time.

Other objects and advantages will be apparent from the following description taken in conjunction with the accompanying drawing wherein:

FIG. 1 is a transverse sectional view of a grease feed device embodying the present invention and mounted in operative relation to a ball bearing;

FIG. 2 is a sectional view taken along line 2—2 of FIG. 1;

FIG. 3 is a sectional view taken along line 3—3 of FIG. 1;

FIG. 4 is a fragmentary sectional view taken along line 4—4 in FIG. 2; and

FIG. 5 is a fragmentary sectional view of a portion of the device in FIG. 1 as it appears when first installed adjacent a bearing.

A grease feed device embodying the invention comprises a grease container that is relatively small in size and adapted to be mounted adjacent a bearing. The container is substantially sealed so grease that is stored therein will not become oxidized or otherwise contaminated. However, the container has an outlet for grease positioned to discharge grease into a bearing. Cooperating with the container is spring operated means for ejecting the grease through the outlet, and restraining means coacting with the bearing and the ejecting means to cause the ejecting means to operate only at certain times, depending on the operation of the bearing. In the preferred form illustrated herein, the restraining means comprises a plurality of wear elements that cooperate with the ejecting means to cause the discharge of grease in a plurality of distinct shots which occur at widely separated time intervals to insure lubrication over a long period of time. The rate at which the elements wear is used as the measure of the time when grease will be discharged into the bearing.

A preferred form of the grease feed device shown in the drawing is adapted for use with bearings of the type having relatively movable inner and outer races separated by rolling elements, such as ball bearings and the like. The present device, indicated generally at 11 in FIGS. 1 and 2, is located in a space adjacent a bearing, indicated generally at 12, mounted in a housing 13.

The bearing 12 is shown as being of conventional form, having an outer race 16, a relatively movable inner race 17, and a plurality of balls 18 separating the races. The outer race 16 is seated in a circular recess 19 formed in the housing 13. The right hand edge of the outer race as shown in FIG. 1 abuts, in part, against an annular shoulder 21 provided in the housing. The inner race is seated on a shaft 22. On its side opposite the shoulder 21, the bearing 12 is provided with a shield 23 that covers the space between the races. Such bearings may be provided with an initial supply of grease packed between their races, and the shield 23 protects such grease and the bearing from dirt and the like. Such initial supply of grease will provide lubrication for the bearing for a considerable length of time. Before the initial supply is completely used up, the device 11 will automatically provide additional clean grease for the bearing through the open side of the bearing adjacent the shoulder 21.

The device 11 is adapted to be mounted adjacent the open side of the bearing 12 and to shield the open side. In this instance, the device 11 encircles the shaft 22 and is mounted in a circular recess 24 formed in the housing 13 adjacent the recess 19. Thus, the device 11 is annular in shape and acts as a shield for the side of the bearing opposite the shield 23.

The device 11 comprises container means for a supply of grease, means for automatically ejecting grease from the container means at certain times, and restraining means for determining when the ejecting means is to operate.

In the present instance, the foregoing means are mounted in a hollow annular casing 26 preferably made of a tough material, such as nylon or impact resistant polystyrene. The casing 26 is generally rectangular in cross-section, as shown in FIG. 1, and has a cylindrical outer wall 27 formed to fit snugly in the recess 24, and a cylindrical inner wall 28 extending about the shaft 22 with a slight clearance 29 therebetween. The walls 27 and 28 are interconnected by an edge wall 31, substantially closing the side of the casing 26 adjacent the bearing 12. At the opposite side of the casing 26, the walls 27 and 28 turn inwardly to provide flanges 32 and 33, respectively, the flanges having a circumferential opening 34 therebetween. The opening 34 is covered by an annular washer 36 which will be described more fully hereinafter. The interior of the casing 26 forms a smooth circular channel in which a radial wall 37, connecting the inner and outer walls 27 and 28, forms an abutment. Near the radial wall 37, the side wall 31 is provided with a small opening 38 (see FIG. 4) through which grease, contained by the device 11, can be ejected into the space between the races of the bearing 12.

Inside the channel formed by the casing 26 is a container for the supply of grease. In the present instance, the container is a collapsible tube 39 of pliable material, such as vinyl acetate or other appropriate material. (The thickness of the material forming the tube is exaggerated in the drawing.) The tube 39 has one end abutting the radial wall 37, as shown in FIG. 2. The one end of the tube 39 is provided with a small opening 41 in alignment with the opening 38 in the casing to permit grease forced from the tube 39 to pass to the bearing. The end of the tube 39 opposite the opening 41 is anchored as shown to the wall 31 of the casing 26 as by a rivet 42. The rivet 42 flattens the end of the tube 39 to provide a wedge-shaped space 40 at the end of the tube, as shown in FIG. 4 to facilitate squeezing grease from the tube 39. The tube 39 is thus confined between the side wall 31 and the washer 36 and also between the outer and inner walls 27 and 28, as shown in FIG. 1.

The casing 26 also contains means for ejecting the grease from the tube 39 through the outlet openings 38 and 41. In the present instance, the ejecting means comprises a plunger 43 actuated by a spring 44. The plunger 43 is formed to fit inside the casing 26 between the side wall 31 and washer 36 and has a surface 46 shaped for pressing grease from the tube 39. The surface 46 is inclined as shown in FIG. 4 to readily enter the wedge-shaped space 40 and also to cooperate with restraining means to be described more fully hereafter. The spring 44 is a compression spring mounted between the plunger 43 and the abutment wall 37. Lugs 47 and 48, on the wall 37 and the plunger 43, respectively, project into the opposite ends of the spring 44. The spring 44 is initially compressed, as shown in FIG. 4, and has sufficient force to gradually push the plunger 43 around the casing 26, flattening the tube 39 against the side wall 31 and thereby ejecting substantially all of the grease contained in the tube.

As previously mentioned, bearings are ordinarily provided with an initial supply of lubricant, and, hence, it is unnecessary for the present device to eject a supply of grease immediately upon being installed adjacent a bearing. Thus, the present device is provided with means for restraining the ejecting means until after its associated bearing has been operated for a time. In the present device, the restraining means comprises an element 49 of abradable material, which is forced by the plunger 43 against the inner race 17 of the bearing to be gradually worn away by operation of the bearing. Until the element 49 is worn away, it blocks movement of the plunger 43 and, hence, prevents ejection of grease until after a period of time.

In the present instance, the element 49 is elongated and is mounted in the casing 26 to project axially therefrom. One end of the element 49 presses against a side of the inner race 17 of the bearing 12. Thus, the element 49 will be worn away as the race rotates. As shown in FIG. 2, the element 49 is mounted in a slot 51 formed in the inner wall 28 of the casing 26, the inner wall 28 being thick enough to provide for the slot 51. The slot 51 is dovetail-shaped to retain the element 49 in operative relation to the race 17, as shown in FIG. 1. The other end of the element 49 is initially engaged by the inclined surface 46 of the plunger 43 and by it is cammed into tight frictional engagement with the inner race 17 of the bearing 12. The element 49 is designed to wear at a certain rate as the bearing operates, and after a period of bearing operation, the member 49 will be worn away enough to release the plunger 43. When released, the plunger 43 rides over the rivet 42 and is forced between the tube 39 and the washer 36 to flatten the tube and squeeze a shot of grease therefrom. Thus, the plunger 43 forces grease from the container and also cams the wear element 49 toward the side of of the bearing.

The present form of the grease feed is adapted to provide the bearing with successive shots of lubricant at spaced periods. To this end, the device is provided with additional wear elements 52 and 53 located at circumferentially spaced points from the wear element 49, as shown in FIG. 2. The elements 52 and 53 are identical to the element 49 and are similarly mounted in dovetail-shaped slots 54 and 56, respectively, formed in the inner wall 28 of the casing 26. The elements 52 and 53 are successively engaged by the plunger 43. The element 52 is engaged after the element 49 has been worn away and a shot of grease forced from the tube. As the element 52 is worn away, the plunger 43 gradually squeezes grease from the tube. When the element 52 is worn away enough to release the plunger 43, another shot of grease is forced from the tube 43. The element 53 is then engaged by the plunger 43, and the operation is repeated. Thus, three distinct shots of lubricant are provided for the bearing by this form of the device. Also, this form of the device gradually ejects grease into the bearing in response to operation during the two periods of operation when the elements 52 and 53 are being worn away.

To hold the wear elements 49, 52 and 53 in place in the device before the device is placed in operative relation to a bearing, the casing 26 is provided with a plurality of clamps, one of which is shown at 57 in FIG. 5. The clamps 57 are secured to the wall 31 and overlie the outer ends of the wear elements 49, 52 and 53, as shown in FIG. 5. The clamps thus prevent the elements from being ejected from their slots by the plunger 43. The clamps 57 are of soft material and are located on the casing 26 so that they are forced against the inner race 17 of the bearing and are quickly worn away during initial operation of the bearing, exposing the ends of the wear elements 49, 52 and 53. The elements 52 and 53 of course are not materially subjected to wear until they are engaged by the plunger 43.

This device includes means for holding it in close proximity to the bearing 12. To this end, the washer 36 is provided with a plurality of spring fingers 58 which are sheared from the washer and extend therefrom to press against the housing 13, as shown in FIG. 1. Thus, the device is forced axially toward the bearing 12 and grease leaving the outlet will enter the space between the races. Also, as the fingers 58 press the device axially against the bearing race 16, they resist any tendency for the device 11 to rotate relative to the housing 13. Moreover, the force exerted by the spring fingers 58 also causes the clamps 57 to be quickly worn away by rotation of the inner race 17.

From the foregoing, it can be seen that the present device provides a supply of lubricant which will be maintained in a clean unoxidized state until it is ejected into a bearing. The device automatically ejects a supply of such grease into the bearing after the bearing has operated a period determined by the wearing of a wear element. Also the device will successively eject additional supplies of lubricant into the bearing as additional wear elements are successively worn away. The device is compact and is inexpensive to manufacture.

I claim:

1. A grease feed device for a bearing, comprising container means providing an annular space for containing grease and having an outlet for the grease contained therein, said container means being adapted to be mounted with said outlet located adjacent the bearing, ejecting means movable through said space toward said outlet for exerting pressure on grease within said container means and thus ejecting grease from said container means through said outlet, and a plurality of restraining means at spaced locations along the path of said ejecting means for restraining the movement of said ejecting means, each of said restraining means being adapted to engage the bearing and be removed from the path of said ejecting means after a period of bearing operation, said ejecting means causing ejection of grease after said removal of each of said restraining means, whereby the operation of said restraining means is dependent on the extent of operation of such bearing.

2. A grease feed device according to claim 1, in which said container means includes an elongated tube adapted to be filled with grease, said tube being closed at one end with the length of the tube extending circularly and adapted to be positioned around a shaft adjacent the bearing.

3. A grease feed device according to claim 1, in which said container means comprises a collapsible tube of thin pliable material for containing the grease, said movement of said ejecting means causing said tube to collapse and thereby eject the grease.

4. A grease feed device according to claim 3, in which said ejecting means comprises a plunger operable to press against said tube and movable along said tube for collapsing the same, thereby discharging grease therefrom.

5. A grease feed device according to claim 3 in which said ejecting means comprises a wedge-shaped plunger and spring means for urging said plunger along said tube.

6. A grease feed device according to claim 4, in which said tube is elongated and said plunger is mounted at one end of said tube, and said ejecting means also includes a spring for progressively urging said plunger longitudinally of said tube.

7. A grease feed device according to claim 1, and further including a casing, said container means comprising an elongated tube of thin pliable material mounted within said casing, said ejecting means also being located within said casing.

8. A grease feed device according to claim 7, in which said ejecting means comprises a plunger initially mounted at one end of said tube and movable longitudinally of said tube within said casing to the other end of said tube, whereby said casing acts as a guide for said plunger.

9. A grease feed device according to claim 1 in which each of said restraining means comprises an element of abradable material positioned to hold said ejecting means inoperative until said element is abraded a predetermined amount by operation of the bearing.

10. A grease feed device for a bearing of the type having spaced relatively movable races, comprising an annular casing adapted to be mounted in axially aligned side by side relation with the bearing, said casing providing an annular space adapted to contain grease and having an outlet for the grease located in the side of said casing in alignment with the space between the bearing races when mounted in assembled relation, ejecting means movable through said space toward said outlet for ejecting grease from said space through said outlet, and a plurality of restraining means at spaced locations along the path of said ejecting means for restraining the operation of said ejecting means, each of said restraining means being adapted to engage one of the races of the bearing and be removed from the path of said ejecting means after the bearing has operated a certain amount, said ejecting means causing ejection of grease after removal of said restraining means.

11. A grease feed device according to claim 10, in which said ejecting means comprises a plunger resiliently urged to move through said casing, each of said restraining means comprising an element of abradable material engageable with said plunger and extending axially from said casing to engage a relatively moving race of the bearing.

12. A grease feed device according to claim 10, in which said ejecting means comprises a plunger resiliently urged to move longitudinally of said space and said restraining means comprises a plurality of abradable elements each extending from said container for engagement with one of the races and located in circumferentially spaced relation about said container for successive engagement by said plunger.

13. A grease feed device according to claim 10, in which said casing provides an annular channel, said ejecting means comprises a plunger resiliently urged to move in an annular path through said channel.

14. A grease feed device according to claim 13, in which said plunger is wedge-shaped to provide a cam surface for engaging said elements to force them one at a time into frictional engagement with a relatively movable portion of the bearing.

15. A grease feed device for a bearing of the type having spaced relatively movable races, comprising an annular casing adapted to contain grease and adapted to be mounted in axially aligned side by side relation with the bearing, said casing having an outlet for grease located in one side of said casing for alignment with the space between the bearing races when mounted in assembled relation, means movable through said casing for ejecting grease from said casing through said outlet, a plurality of means in said one side of said casing engageable with said ejecting means for restraining the operation of said ejecting means, and spring means on the opposite side of said casing for urging said casing toward the bearing to position said outlet adjacent the bearing.

16. A grease feed device according to claim 15, in which each of said restraining means comprises an abradable element projecting from said one side of said casing and initially held in position by a clamp of soft material at said one side, whereby said spring means forces said clamp against a relatively moving race of the bearing to cause the clamp to be quickly worn away thereby releasing said element.

17. A grease feed device according to claim 15, adapted to be mounted in a housing for the bearing and in which said spring means comprises a washer having a plurality of circumferentially extending spring fingers positioned for engagement with the housing to force said casing axially toward the bearing.

18. A grease feed device for a bearing, comprising a casing adapted to contain grease and having an outlet for grease provided therein, said casing being adapted to be mounted with said outlet located adjacent the bearing, and means for gradually ejecting grease from said casing in response to operation of said bearing, said means comprising a plunger movable through said casing, means for forcing said plunger in one direction through said casing to eject grease from said casing through said outlet, and a plurality of elements of abradable material positioned at spaced locations to oppose said forcing means and adapted to engage the bearing and be worn away gradually in response to operation of the bearing.

19. A grease feed according to claim 18, in which said element is elongated and has one end adapted to bear against a relatively rotating part of the bearing to be gradually worn away thereby, the opposite end of said element bearing against said plunger.

20. In combination, a bearing housing having a circular recess therein, a bearing mounted in said recess and having a pair of relatively rotatable races separated by a plurality of rolling elements, and an annular grease feed device mounted in said recess adjacent said bearing, said device having means coacting with said housing for holding said device in abutment with one of said races at one side of said bearing, and forming a shield for one side of said bearing, said device being adapted to automatically eject grease from said device into said bearing between said races.

References Cited by the Examiner

UNITED STATES PATENTS

| | | | |
|---|---|---|---|
| 2,031,671 | 2/36 | Rising. | |
| 2,403,397 | 7/46 | Rankin | 308—93 |
| 2,785,023 | 3/57 | Naumann | 308—187 |
| 2,850,336 | 9/58 | Dochterman | 184—45 X |
| 2,999,725 | 9/61 | Schaefer | 184—1 X |

ROBERT C. RIORDON, *Primary Examiner.*

FRANK SUSKO, *Examiner.*